Patented June 29, 1954

2,682,493

UNITED STATES PATENT OFFICE 2,682,493

STREPTOMYCIN PRODUCTION USING HENS' EGGS

Robert D. Muir, Manlius, and Alden B. Hatch, Syracuse, N. Y., assignors to Bristol Laboratories Inc., Syracuse, N. Y., a corporation of New York No Drawing. Application January 17, 1952, Serial No. 266,990

4 Claims. (Cl. 195—80)

This invention relates to the production of streptomycin by fermentation with strains of microorganisms such as *Streptomyces griseus* and to improved media for use in such fermentation.

It is an object of this invention to provide media for the fermentation of *Streptomyces griseus* which result in higher yields of streptomycin than are achieved using previously known media.

The production and properties of streptomycin have been described: Schatz, Bugie & Waksman, Proc. Soc. Exptl. Biol. Med., 55, 66–9 (1944). Waksman & Schatz, Jour. Am. Pharm. Assoc. (Sci. Ed.) 34, 273 (1945); Proc. Nat. Acad. Sci., 31, 129 (1945). Commercial production of streptomycin has also been described (R. W. Porter, Chem. Eng. 53, 94–98, 142–145 (Oct. 1946).

We have now discovered, in accordance with the present invention, a process for the production of streptomycin which comprises growing *Streptomyces griseus* under submerged aerobic conditions in a nutrient medium containing hen's eggs as a factor promoting growth and stimulating the production of streptomycin, and isolating the streptomycin thus produced.

Assays of the streptomycin contents of the solutions were carried out by the disc method using Waksman's strain of *B. subtilis* as the test organism.

Example I

A suitable aqueous medium for the fermentation of *Streptomyces griseus* No. 5 to produce streptomycin has the following composition:

| | Percent |
|---|---|
| $K_2HPO_4$ | 0.025 |
| $MgSO_4$ | 0.2 |
| $NH_4Cl$ | 0.4 |
| $CaCO_3$ | 0.25 |
| Glucose | 1.0 |
| Peptone | 0.6 |

Laboratory shake flask experiments were carried out in which egg yolks, egg whites, or whole eggs were added to or substituted for the peptone. The eggs were fresh hen's eggs and were whipped prior to use in a mixing device such as that disclosed in U. S. Patent 2,109,501. The results of duplicate experiments were as follows:

| Constituent(s) | Percent | Peak assay, Units/ml. | |
|---|---|---|---|
| | | Run 1 | Run 2 |
| Peptone | 0.6 | 10 | 320 |
| Egg white | 0.5 | 0 | 3 |
| | 1.0 | 1 | 10 |
| | 2.0 | 5 | 33 |
| Egg yolk | 0.5 | 430 | 446 |
| | 1.0 | 245 | 188 |
| | 2.0 | 70 | 125 |
| Whole Egg | 1.0 | 326 | 339 |
| | 2.0 | 295 | 207 |
| | 4.0 | 196 | 64 |
| Peptone 0.6% plus egg white | 0.5 | 10 | 144 |
| | 1.0 | 9 | 137 |
| | 2.0 | 32 | 159 |
| egg yolk | 0.5 | 470 | 722 |
| | 1.0 | 667 | 675 |
| | 2.0 | 174 | 270 |
| whole eggs | 1.0 | 442 | 874 |
| | 2.0 | 486 | 483 |
| | 4.0 | 264 | 67 |

The use of peptone was accompanied by unexplained variations in yields. Possibly these were due to the presence or absence of trace elements. It was obvious, however, that egg yolks or whole eggs have higher and more uniform results when used either as a substitute for peptone or as an adjuvant to the peptone in these small scale experiments.

Example II

Experiments on a larger scale were carried out under the following conditions:

| | |
|---|---|
| Glass-lined tanks | 100 gallon capacity |
| Temperature | 23° C. |
| Agitation | 90 R. P. M. |
| Volumes air/volume broth per minute | 3 to 4 |

Medium composition:

| | |
|---|---|
| Dextrose | 1.0% |
| Peptone | 0.6% |
| $K_2HPO_4$ | 0.05% |
| $MgSO_4$ | 0.05% |
| $CaCO_3$ | 0.40% |
| Water | q. s. 100% |

80 gallons medium were used in each tank.

Frozen eggs (tanners' eggs) were added to the medium prior to sterilization after being thawed out and homogenized with a stirrer.

| Percent Eggs added | Peak yield, units/ml. | Time of peak yield, hr. |
|---|---|---|
| 0.6 | 163 | 134 |
| 1.0 | 510 | 174 |
| 1.6 | 340 | 173 |
| 2.5 | 576 | 113 |
| 2.5 | 760 | 119 |
| 2.5 | 910 | 128 |

When no eggs were added the peak yield, reached after an average of 100 hours, averaged 291 units per ml. for six runs.

Example III

The conditions were the same as in Example II except that 1% soy bean meal and 1% cerelose replaced the dextrose and peptone.

The peak yields as a function of added eggs were as follows:

| | Units/ml. |
|---|---|
| No eggs | 374 |
| 0.1% eggs | 469 |
| 0.3% eggs | 462 |
| 0.5% eggs | 410, 434 |
| 1.0% eggs | 290 |
| 1.5% eggs | 240 |
| 2.5% eggs | 145 |

In conjunction with this medium, it was seen that a smaller amount of egg (0.1 to 0.5%) was optional and that larger amounts were actually deleterious.

Example IV

Conditions similar to those of Example II are used except that commercially-available, dried, powdered eggs are used. The peak yield of streptomycin is found to be greater than in experiments without eggs when the optimum concentration of the eggs is used. This optimum concentration lies between 0.1 and 3.0 percent.

The media used must contain a source of assimilable carbon, such as glucose, maltose, dextrose, potato starch, or hydrol which may be present in amounts such as 0.75 to 4.0%, preferably about one percent.

Certain inorganic nutrient salts must also be supplied. These may be selected from the following list, which gives in parentheses one amount which may be used in the media, but it is to be understood that not all of these salts need be present simultaneously: $NaCl$ (1%), $NaNO_3$ (0.5%), $K_2HPO_4$ (0.1%) $MgSO_4 \cdot 7H_2O$ (0.1%), $KCl$ (1%), $CaCl_2$ (0.01%), $NH_4Cl$ (0.4%), $CaCO_3$ (0.25%), $FeSO_4 \cdot 7H_2O$ (0.001%), $ZnSO_4 \cdot 7H_2O$ (0.0002%), $(NH_4)_2SO_4$ (0.25%), $Na_2SO_4$ (0.5%). Thus the sodium chloride content may vary up to 3% of the medium, with the optimal concentration usually falling within the range, 0.10 to 1.1%.

The proportion of hen's eggs or their equivalent to be used in this process may vary within wide limits, but advantageously is about 0.1%–4.0% of the medium. The eggs may be used in addition to or as replacement for such customary materials as peptone, beef extract, fermentation solubles, corn steep liquor, dried brewers' yeast, primary yeast, bean meals, peanut meal, cottonseed meal, flaxseed meal, and soybean meal.

The eggs to be used in this process may be obtained cheaply and advantageously by using the rejects from plates which open and either freeze or dry whole eggs for sale to bakeries and such consumers. The eggs may be fresh, dried or frozen whole eggs or egg yolks.

In preparing streptomycin by the improved process of the present invention, a medium of the above composition is placed in a suitable deep vessel having means for agitation and aeration of the medium, sterilized as by heating at 120° C. for thirty minutes, and cooled to about 25° C. The sterilized medium is then inoculated with a culture of *Streptomyces griseus*. The concentration of the inoculum is somewhat arbitrary but the applicants like to use about 1% to about 10% by volume of the medium. The medium is incubated at about 22°–35° and preferably about 28° C. under aerobic submerged conditions, i. e. constant agitation and aeration, An anti-frothing agent, for instance, a solution of a higher alcohol in an oleaginous medium may be introduced periodically in sufficient quantity to subdue frothing. The maximum streptomycin production under these conditions is usually reached in about three to four days. At this time the growth is removed by filtration. The streptomycin is recovered from the liquid medium by means now well known to the art, as, for example, by treating the filtrate of the culture broth with activated charcoal to adsorb the streptomycin, and eluting the charcoal with a low normality aqueous alcoholic solution of acid to form an aqueous solution containing streptomycin from which streptomycin can readily be recovered by known methods. By this procedure yields of streptomycin, in terms of units present per milliliter of culture filtrate, average about 400 units per milliliter. It will, of course, be apparent that the yields in different batches may vary considerably due to differences in the streptomycin-producing properties of inocula and inherent differences in the eggs available from time to time.

Modifications may be made in carrying out the present invention without departing from the spirit and scope thereof, and we are to be limited only by the appended claims.

We claim:
1. A process for the production of streptomycin by a fermentation procedure, which comprises: growing *Streptomyces griseus* under aerobic submerged conditions in a nutrient medium containing hens' eggs as a factor promoting growth and stimulating the production of streptomycin, and isolating the streptomycin thus produced.

2. A process for the production of streptomycin by a fermentation procedure, which comprises: growing *Streptomyces griseus* under aerobic submerged conditions in a nutrient medium containing hens' egg yolks as a factor promoting growth and stimulating the production of streptomycin, and isolating the streptomycin thus produced.

3. A process for the production of streptomycin by a fermentation procedure, which comprises: growing *Streptomyces griseus* under aerobic submerged conditions in a nutrient medium contaning dried hens' eggs as a factor promoting growth and stimulating the production of streptomycin, and isolating the streptomycin thus produced.

4. A process for the production of streptomycin by a fermentation procedure, which comprises: growing *Streptomyces griseus* under aerobic submerged conditions in a nutrient medium containing frozen hens' eggs as a factor promoting growth and stimulating the production of streptomycin, and isolating the streptomycin thus produced.

References Cited in the file of this patent

UNITED STATES PATENTS

| Number | Name | Date |
|---|---|---|
| 2,449,866 | Waksman | Sept. 21, 1948 |
| 2,523,245 | Coppock | Sept. 19, 1950 |
| 2,538,942 | McDaniel | Jan. 23, 1951 |

OTHER REFERENCES

Levine et al., Culture Media for Cultivation of Microorganism, 1930, Williams and Wilkins, pp. 790 to 792, 800 to 801.

Winton et al., The Structure and Composition of Foods, vol. III, 1937, Wiley, pp. 242 to 250.

Dulaney Jour. Bact. 56, #3, Sept. 1948, pp. 305 to 313.

Waksman, The Actinomycetas, 1950, pub. by Chronica Botanica Co., Waltham, Mass., pp. 195, 197.